United States Patent [19]
Davis

[11] 3,762,218
[45] Oct. 2, 1973

[54] STOCK POINT INDICATING DEVICE WITH LINEAR SENSING MEANS

[75] Inventor: Mike Davis, Houston, Tex.

[73] Assignee: Dresser Industries, Inc., Dallas, Tex.

[22] Filed: Aug. 19, 1971

[21] Appl. No.: 173,166

[52] U.S. Cl. .................................................. 73/151
[51] Int. Cl. ............................................ E21b 47/00
[58] Field of Search .............. 73/151, 152; 323/90; 336/130; 166/241, 255

[56] References Cited
UNITED STATES PATENTS
2,530,309  11/1950  Martin .................................... 73/151
3,006,186  10/1961  Berry ...................................... 73/151

Primary Examiner—Jerry W. Myracle
Attorney—Robert W. Mayer et al.

[57] ABSTRACT

The body of the device, consisting of two relatively movable sections, is lowered into a well at the end of a cable. A bow spring anchor assembly is mounted upon each of the sections in a manner that allows the sections to rotate freely and move axially relative to the bow springs until a measurement is to be made. The sections are locked to the anchor assemblies upon command from the surface and a stuck point measurement is made. A sensing means in the body of the device detects relative movement of the two sections and produces a linear signal representing said movement. The sensing means includes a movable spiral wedge-shaped element.

7 Claims, 4 Drawing Figures

INVENTOR:
MIKE DAVIS

Eddie L. Scott
ATTORNEY

PATENTED OCT 2 1973 3,762,218

INVENTOR:

MIKE DAVIS

Eddie E. Scott

ATTORNEY 3,762,218

STOCK POINT INDICATING DEVICE WITH LINEAR SENSING MEANS

BACKGROUND OF THE INVENTION

The present invention relates to apparatus for determining the point or points at which drill pipe, casing, tubing or the like is stuck in an earth borehole. For convenience, the term pipe will be used hereinafter to include casing, tubing, drill pipe and the like. Although there are many reasons for determining the location at which a pipe is stuck, the principal reasons relate to removal of the free pipe above the stuck point or the performance of various operations at the stuck point with or without removal of the pipe.

The approximate location of the stuck point may be estimated by stretching the free pipe above the stuck point and predicting the location of the stuck point from the physical manifestation of the pipe at the surface. Once the approximate location of the stuck point is known, a stuck point indicating device is lowered into the pipe to locate the actual stuck point. The stuck point indicating device generally consists of a pair of spaced members connected by a sensing means that permits a limited amount of relative movement between the spaced members and produces a signal representing the relative movement. Each of the spaced members includes an anchor assembly that allows the individual member to be connected to the pipe.

When a stuck point measurement is to be made, each individual spaced member is connected to the pipe in some manner and a force applied to the upper portion of the pipe. For example, the force may be torque applied to the upper end of the pipe to twist the pipe with the individual spaced members rotating relative to each other or remaining stationary depending upon whether the torque applied to the upper end of the pipe has produced relative rotation of the portions of the pipe engaged by the members. It will be understood that when the torque is applied to the upper end of the pipe, the length of the pipe from the upper end thereof down to the stuck point will twist and that the applied torque will not twist the pipe below the stuck point. Therefore, the operator may lower the device progressively down through the pipe in step by step order applying a twist to the pipe as each new position of the device in the pipe is estabished thereby determining for each position of the device whether or not the twist applied to the upper end of the pipe has produced relative rotation of the individual spaced members. When the device passes the stuck point, no relative rotation of the individual spaced members will occur. The operator could, of course, start the test near the lower end of the pipe below the stuck point where no relative rotation of the spaced members of the device occurs and conduct the measurements consecutively upward ubtil the device is brought into a position where the torque applied to the upper end of the drill pipe produces relative rotation of the spaced members.

After the stuck point is located, it may be desirable to remove the free pipe above the stuck point from the well. One method of accomplishing this is by locating the first free joint above the stuck point. A predetermined amount of torque is applied to the pipe and an explosive charge exploded at the free joint to break the joint allowing the free pipe to be unscrewed and removed from the well. Under other conditions, a device for severing the pipe is positioned at a point above the stuck point. The pipe is severed and the section of the pipe thus released withdrawn from the well.

When the stuck point indicating device is being moved into position for a measurement, the bow spring anchor assemblies are in contact with the wall of the pipe. In order to prevent the sensing elements from being damaged during the positioning of the device, movement of the body of the device relative to the anchor assemblies should be provided. When the stuck point measurement is to be made, the body of the device must be locked to the anchor assemblies. Prior to the development of the present invention, the sensing elements of the stuck point indicating device had to be set at an initial position before a measurement could be made and the signal generated by the prior art devices was not a linear representation of relative movement of the spaced members.

BRIEF DESCRIPTION OF THE PRIOR ART

In U. S. Pat. No. 2,550,964 to N. Brooks patented May 1, 1951, a device for determining the point at which a pipe is stuck in a well is shown. The device includes a pair of spaced expansible members adapted to be lowered into a pipe in the well. These members are connected by a sensing structure that permits relative movement of the expansible members. The expansible members engage spaced portions of the pipe wall. Torque is applied to the upper end of the pipe to twist it and the expansible members of the device rotate relative to each other or remain stationary depending upon whether the torque applied to the upper end of the pipe has produced relative rotation of the portions of the pipe engaged by the expansible members. An electrical control means in the device is responsive to relative movement of the spaced members and when this electrical control means is coupled with an indicator apparatus at the surface, a signal is produced indicating relative movement of the spaced members.

In U. S. Pat. No. 3,004,427 to Theodore L. Berry patented Oct. 1, 1961, a stuck point indicating device including a variable inductance is shown. The variable inductance is connected with instruments on the surface that will sense variations in the variable inductance. Individual elements of the variable inductance are connected to sections of the device that are movable relative to each other. The sections containing the individual elements of the inductance are temporarily seated or anchored within the pipe and the pipe is subjected to a change in stress. The change in stress may be brought about by applying torque to the pipe to twist the pipe. Alternatively, the pipe may have tension applied thereto to stretch the pipe. The change in stress of the pipe affects the variable inductance in a very minute, but nevertheless measurable, manner if that portion of the pipe within which the tool is seated is free and is not stuck. On the other hand, if the tool is seated within a stuck portion of the pipe, the change in stress on the pipe has little, if any, effect on the variable inductance. Before a stuck point measurement is made, the individual elements of the variable inductance must be placed in an initial position relative to each other. A direct current is applied to the individual elements of the variable inductance to create a magnetic attraction between the elements and they are drawn to the required initial position.

In U. S. Pat. No. 3,006,186 to Theodore L. Berry patented Oct. 31, 1961, a stuck point indicating device is shown that includes a variable inductance sensing mechanism. A pair of bow spring anchor assemblies are connected to the sectional body of the device by rotational friction joints. The device is lowered into a pipe and forced down through the pipe by weights. When a stuck point measurement is to be made, the weights are lifted by the cable to prevent them from interfering with relative movement of the upper and lower sections of the device. The sensing mechanism is moved to an initial position and the stuck point measurement is made.

SUMMARY OF THE INVENTION

The present invention provides a device that may be lowered into a pipe at the end of a cable to locate the point at which the pipe is stuck in a well by providing an indication of relative movement between a pair of spaced members. The device has an upper member and a lower member connected by means for providing an indication of relative movement between the upper and lower members. Individual anchor means that contact the wall of the pipe are carried by the upper and lower members. The upper and lower members are rotatably and axially movable relative to the anchor means until they are locked in position when a measurement is to be made. A sensor provides a linear indication of relative movement between the upper and lower members without being set at an initial position prior to the measurement.

It is therefore an object of the present invention to provide a stuck point indicating device that will provide a linear indication of relative movement of the individual spaced members.

It is a further object of the present invention to provide a stuck point indicating device that will provide a stuck point measurement without the sensing means being set at an initial position.

It is a still further object of the present invention to provide a stuck point indicating device that includes anchor means that are normally rotatable relative to the body of the device and are locked to the body of the device when a stuck point measurement is to be made.

It is a still further object of the present invention to provide a stuck point indicating device that includes anchor means that are normally movable axially relative to the body of the device and are locked to the body of the device when a stuck point measurement is to be made.

It is a still further object of the present invention to provide a stuck point indicating device that is unaffected by cable movement.

The above and other objects and advantages of the present invention will become apparent from a consideration of the following detailed description of the invention when taken in conjunction with the accompanying drawings.

DETAILED DESCRIPTION OF THE INVENTION

Figure 1:
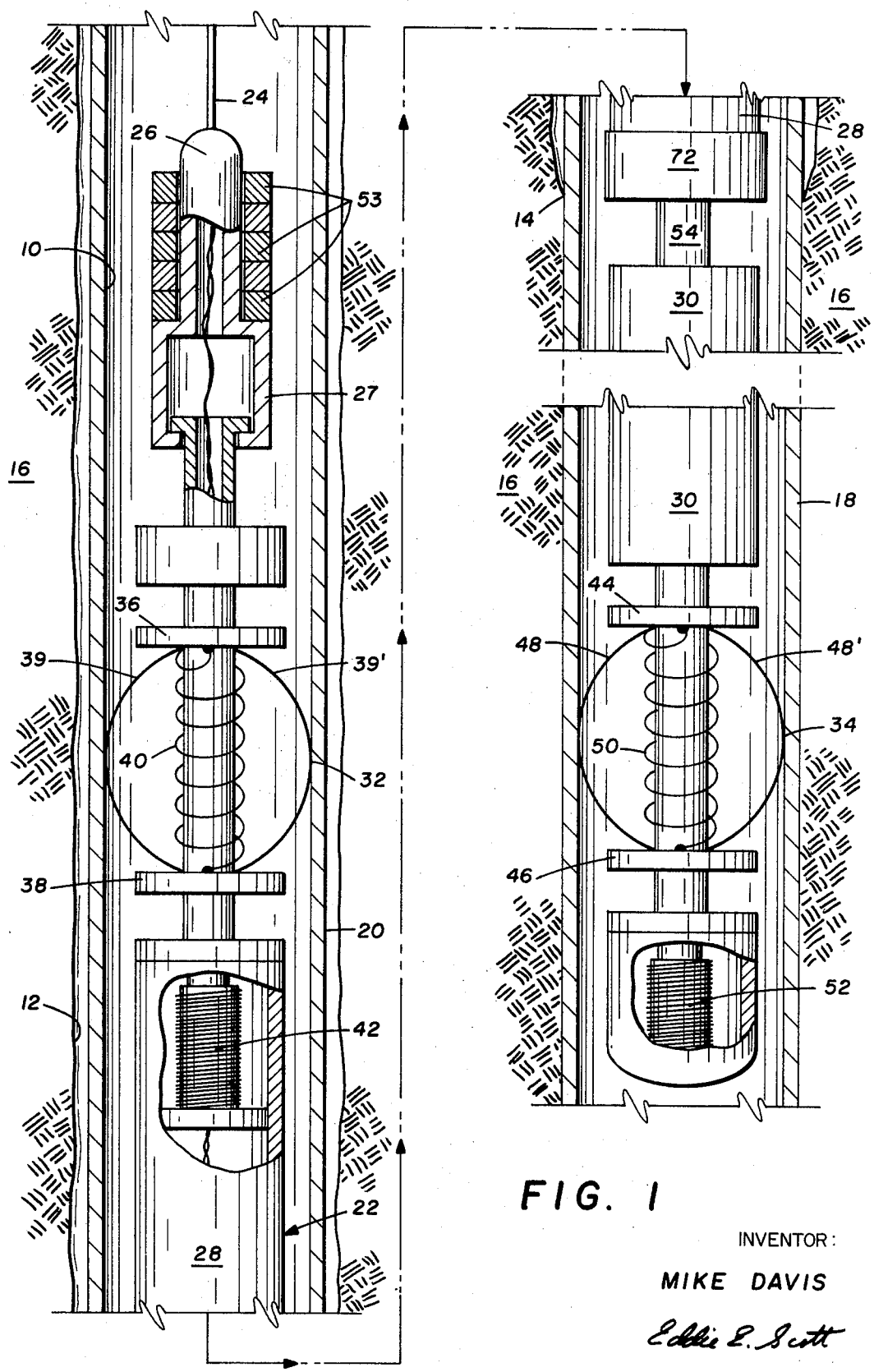
FIG. 1 is a fragmentary sectional view showing a portion of a pipe which is stuck in a well with the preferred embodiment of the present invention positioned in the pipe for taking a stuck point measurement.

Referring now to FIG. 1, a portion of a pipe 10, such as a portion of a string of drill pipe, is shown extending into a well bore 12. This pipe 10 has become stuck with the well bore 12 at a point 14 wherein a portion of the earth formation 16 surrounding the pipe 10 has closed in around the portion of the pipe 10 below the point 14. The lower portion 18 of the pipe 10 below the stuck point 14 may be referred to as the stuck portion of the pipe whereas the upper portion 20 of the pipe 10 constitutes the free or unstuck portion. When the pipe 10 is standing in the borehole without any pull exerted on its upper end, much of the upper portion 20 will be under compression due to the weight of the pipe extending upwardly from stuck point 14, this compression gradually diminishing toward the upper end of the free portion 20. If an upward pull is applied to the upper end of the pipe 10, the free portion 20 will be elongated and this elongation will be substantially constant throughout the entire length of the free portion 20 of the pipe for the reason that the change in stress applied to the pipe due to the upward pull thereon will be substantially constant. It will also be understood that a torque or twist applied to the upper end of the pipe 10 will produce a twisting stress throughout the length of the upper portion 20 of the pipe 10 but that no stress will be experienced in the lower portion 18 below the stuck point 14.

A stuck point indicating device generally designated by the reference number 22 is shown positioned within the pipe 10. The stuck point indicating device 22 is lowered into the pipe 10 by a cable 24 connected to a cablehead section 26 by a slip joint 27. The stuck point indicating device 22 in general consists of an upper section 28 and a lower section 30 connected together in a manner that permits relative rotation of the two sections and a limited amount of relative axial movement between the two sections. An upper bow spring anchor assembly 32 is positioned on the upper section 28 and a lower bow spring anchor assembly 34 is positioned on the lower section 30.

The upper bow spring anchor assembly 32 consists of a pair of collars 36 and 38 positioned around a reduced diameter portion of the upper section 28 of the stuck point indicating device 22. A multiplicity of bow springs 39, 39', etc. are connected between collars 36 and 38 and a spring 40 urges the collars 36 and 38 together thereby forcing the bow springs 39, 39' outward against the wall of the pipe 10. The pressure of the bow springs 39, 39' against the wall of the pipe 10 anchors the upper anchor assembly 32 to the pipe 10. When the device 22 is being moved into position, the anchor connection is overcome by a suitable force. When the device 22 is in position for a measurement a firm anchor connection is maintained. The upper section 28 of the device 22 is free to rotate relative to the upper anchor assembly and a limited amount of axial movement between the upper section 28 and the upper anchor assembly 32 is provided when the device 22 is being moved into position because the collars 36 and 38 can move on the reduced diameter portion of the device 22. An electromagnet 42 is positioned within the upper section 28 immediately below the collar 38. When the electromagnet 42 is energized, collar 38 becomes seated upon and temporarily affixed to the upper section 28 of stuck point indicating device 22. This allows the upper section 28 of the device 22 to be locked to the upper anchor assembly 32 when a stuck point measurement is to be made.

The lower bow spring anchor assembly 34 consists of a pair of collars 44 and 46 positioned around a reduced diameter portion of the lower section 30 of the stuck point indicating device 22. A multiplicity of bow springs 48, 48', etc. are connected between the collars 44 and 46 and a spring 50 urges collars 44 and 46 together thereby forcing the bow springs 48, 48' outward against the wall of the pipe 10. The pressure of the bow springs 48, 48' against the wall of the pipe 10 anchors the lower anchor assembly 34 to the pipe 10. When the device 22 is being moved into position, the anchor connection is overcome by a suitable force. When the device 22 is in position for a measurement, a firm anchor is maintained. The lower section 30 of the device 22 is free to rotate relative to the lower anchor assembly 34 and a limited amount of axial movement between the lower section 30 and the lower anchor assembly 34 is provided when the device 22 is being moved into position because the collars 44 and 46 can move on the reduced diameter portion of the device 22. An electromagnet 52 is positioned within the lower section 30 immediately below collar 46. When the electromagnet 52 is energized, collar 46 becomes seated upon and temporarily affixed to the lower section 30 of stuck point indicating device 22. This allows the lower section 30 of the device 22 to be locked to the lower anchor assembly 34 when a stuck point measurement is to be made.

The device 22 is moved downward into position by the force of a series of weights 53 mounted upon the upper end of the device that overcome the anchor connections of the upper and lower anchor assemblies 32 and 34. Once the device 22 is in position a slight upward movement of the cable 24 removes the force of the weights 53 from the device 22 because of the slip joint 27. This leaves the device 22 supported entirely by the anchor assemblies 32 and 34 and any up or down movement of the cable 24 does not affect the measurement. The device 22 is moved upward into position by an upward force being applied to the cable 24 to overcome the anchor connections of the upper and lower assemblies 32 and 34. The movement, rotational and axial, that is allowed between the two sections of the device 22 and the anchor assemblies 32 and 34 prevents any damaging stress from being applied to the device's sensing means when the device 22 is being moved into position.

Figure 2:
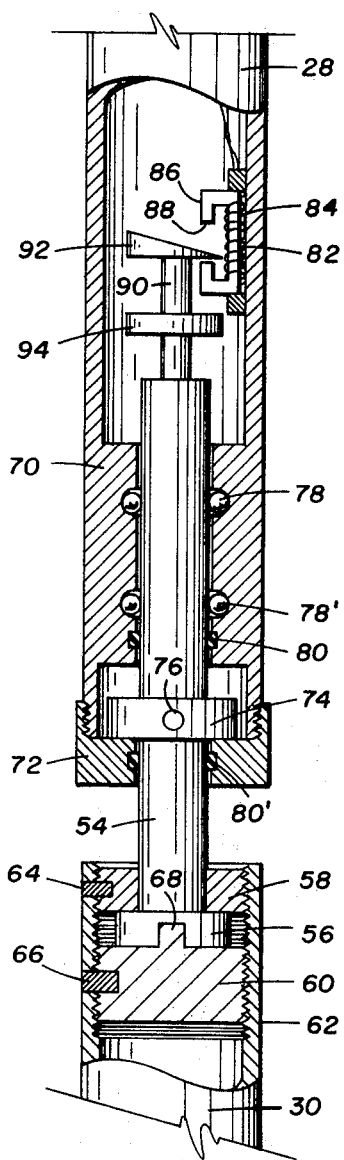
FIG. 2 is a sectional view of the middle portion of the stuck point indicating device showing the sensing means for sensing relative movement of the upper and lower sections.

Referring now to FIG. 2, the middle portion of the stuck point indicating device 22 is shown wherein the upper section 28 and the lower section 30 are connected in a manner that permits relative rotation of the two sections and a limited amount of axial movement between the two sections. A cylindrical shaft 54, with an enlarged head 56, extends upward from the lower section 38 of the stuck point indicating device 22. The enlarged head 56 of shaft 54 is positioned between a pair of threaded plugs 58 and 60 that mate with the internal threads of the lower section housing 62. The plugs 58 and 60 are locked in place by a pair of keys 64 and 66 that extend through housing 62. The lower plug 60 includes an elongated key 68 that fits within a slot in the head 56 of shaft 54 to prevent the shaft from rotating relative to the lower section 38.

Shaft 54 extends upward into the upper section housing 70 and is held therein by a cap 72 connected to the end of housing 70 and a collar 74 firmly affixed to shaft 54 by a key 76. The collar 74 allows a limited amount of axial movement between the upper section 28 and the lower section 30. A series of ball bearings 78, 78' and a pair of O-ring seals 80, 80' are positioned between the shaft 54 and the housing 70 and cap 72 to reduce friction and prevent fluid standing in the borehole from entering the interior of housing 70. Complete freedom of rotation and a degree of axial movement is permitted between the two sections and the rotation and axial movement is detected and measured by a sensor mounted in the housing 70 of the upper section 28.

The sensor is a variable inductance sensing means positioned within housing 70 for detecting relative movement between the two sections 28 and 30 of the stuck point indicating device 22. The variable inductance 82 consists of a coil 84 and a fixed core 86 with an air gap 88. A movable core element 90 is connected to the upper end of shaft 54 and includes a spiral wedge-shaped element 92 that extends into the air gap 88. The movable core element 90 also includes a collar 94 positioned below the fixed core 86. The movable core element 90 is constructed of a magnetic material to increase the variable inductance's sensitivity to relative movement either rotational or axial between the upper and lower sections 28 and 30.

Figure 3:
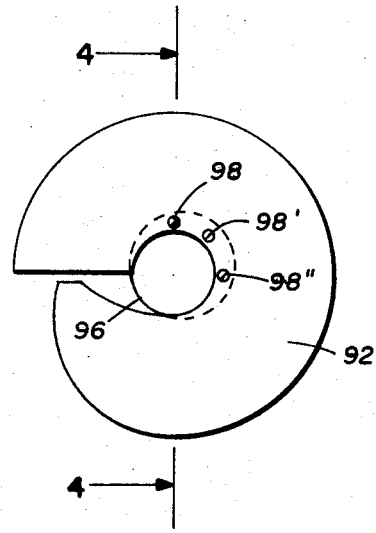
FIG. 3 is a top view of an element of the sensing means shown in FIG. 2.
Figure 4:
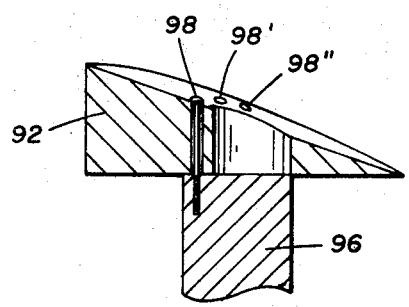
FIG. 4 is a sectional view taken along line 4—4 of FIG. 3.

The movable core element 90 is shown in greater detail in FIGS. 3 and 4, FIG. 3 being a top view of the element and FIG. 4 being a sectional view taken along lines 4—4 of FIG. 3. As shown in FIG. 3, the element 92 is spiral in shape and is connected to the upper end of a cylindrical shaft 96 by a series of screws 98, 98', etc. The cross section of element 92 as shown in FIG. 4 is in the form of a wedge with an increasing cross sectional area from the small end to the large end. As relative movement occurs between the two sections of the device element 92 will change position relative to the core 86 and air gap 88 and a measurement of the relative movement may be obtained.

The structural details of one embodiment of a stuck point indicating device constructed in accordance with the present invention having been described, the operation of the embodiment will now be considered. The stuck point indicating device 22 is lowered into the pipe 10 by cable 24. The bow spring anchor assemblies 32 and 34 contact the wall of the pipe and offer a resistance to movement of the stuck point indicating device 22. This resistance is overcome by the weights 53 positioned on the upper and of the device. The upper and lower sections 28 and 30 of the device are free to rotate relative to the upper and lower anchor assemblies 32 and 34 and a limited amount of axial movement between the anchor assemblies and the device is provided. As the device 22 moves downward into position the sensor is protected from damaging stresses. If the device 22 is being moved upward in the pipe 10 into position for a stuck point measurement, the force required to overcome the resistance of the bow spring anchor assemblies is provided through cable 24.

Once the device 22 is in position for a stuck point measurement, the electromagnets 42 and 52 are energized. The stuck point indicating device 22 is moved upward a small distance so that the collars 38 and 46 are locked to the device 22 by the electromagnets 42 and 52. The cable 24 is then moved downward a small distance. The cable head 26 moves to an intermediate position on the slip joint 27 and any adverse effect of up and down movement of the cable 24 is eliminated. Since the force of the weights 52 is not being transmitted to the body of the device 22, the device is suspended by and firmly connected to the anchor assemblies 32 and 34.

The upper end of the pipe 10 is stressed either by tension being applied to the upper end of the pipe or torque being applied to the upper end of the pipe. Since the upper portion 28 is firmly connected to one section of the pipe 10 by anchor assembly 32 and the lower section 30 is connected to another portion of the pipe 10 by anchor assembly 34, the stuck point 14 can be detected by noting whether the stress applied to the upper end of the pipe has caused relative movement between the upper section 28 and lower section 30 of the stuck point indicating device 22.

The variable inductance sensing means does not have to be set at an initial position before a stuck point measurement is made. Any movement of the movable core element 90 will cause the variable inductance 82 to have a changed electrical characteristic and relative movement of the sections 28 and 30 can be determined. Relative rotational movement of the sections 28 and 30 causes the spiral wedge-shaped element 92 to change position within the air gap 88 and a different cross sectional thickness is positioned within the air gap 88. Any relative axial movement of the sections 28 and 30 will cause a change in position of the collar 94 and movable core element 90 thereby changing the electrical characteristics of the variable inductance 82. After the measurement has been made the electromagnets are deenergized and the device moved to a different position for another measurement.

The embodiments of the invention in which an exclusive property or privilege is claimed are defined as follows:

1. An apparatus for determining the point a pipe is stuck in a well, comprising:
    an upper body;
    an upper anchor assembly positioned on said upper body for connecting said upper body to said pipe;
    upper controllable means positioned on said upper body for allowing said upper body to move relative to said upper anchor assembly and for selectively locking said upper body to said upper anchor assembly;
    a lower body;
    a lower anchor assembly positioned on said lower body for connecting said lower body to said pipe;
    means for connecting said upper and lower bodies;
    means for allowing said upper and lower bodies to rotate relative to each other; and
    sensor means for sensing relative rotation of said upper and lower bodies.

2. The apparatus of claim 1 wherein said upper controllable means includes a collar rotatably mounted on said upper body and an electromagnet positioned on said upper body approximate said collar.

3. The apparatus of claim 1 including lower controllable means positioned on said lower body for allowing said lower body to move relative to said lower anchor assembly and for selectively locking said lower body to said lower anchor assembly.

4. The apparatus of claim 1 including means for allowing a limited amount of axial movement between said upper body and said lower body.

5. The apparatus of claim 4 wherein said sensor means includes a variable inductance for sensing relative movement of said upper and lower bodies, said variable inductance including a fixed portion connected to one of said bodies and a movable portion connected to the other of said bodies.

6. An apparatus for determining the point a pipe is stuck in a well, comprising:
    an upper body;
    an upper anchor assembly positioned on said upper body for connecting said upper body to said pipe, said upper anchor assembly including a collar rotatably mounted on said upper body and an electromagnet positioned in said upper body approximate said collar;
    a lower body;
    a lower anchor assembly positioned on said lower body for connecting said lower body to said pipe;
    means for connecting said upper and lower bodies;
    means for allowing said upper and lower bodies to rotate relative to each other;
    means for allowing a limited amount of axial movement between said upper body and said lower body; and
    variable inductance means for sensing relative movement of said upper and lower bodies, said variable inductance means including a fixed portion connected to one of said bodies and a movable portion connected to the other of said bodies.

7. The apparatus of claim 6 wherein said lower anchor assembly includes a collar rotatably mounted upon said lower body and an electromagnet positioned in said lower body proximate said collar.

* * * * *